United States Patent
Brillhart et al.

(10) Patent No.: US 8,635,024 B2
(45) Date of Patent: Jan. 21, 2014

(54) SENSING DEVICE FOR DETERMINING WEATHER EVENT ATTRIBUTES

(75) Inventors: David C. Brillhart, Orlando, FL (US); Nicholas J. Karels, Aurora, IL (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 12/848,692

(22) Filed: Aug. 2, 2010

(65) Prior Publication Data

US 2012/0029823 A1 Feb. 2, 2012

(51) Int. Cl.
*G01W 1/00* (2006.01)

(52) U.S. Cl.
USPC ............ 702/3; 702/23; 702/45; 702/55

(58) Field of Classification Search
USPC ........................................... 702/1, 2, 3
See application file for complete search history.

(56) References Cited

U.S. PATENT DOCUMENTS

| | | | |
|---|---|---|---|
| 4,613,008 A | 9/1986 | Hiraiwa et al. | |
| 5,440,483 A | 8/1995 | Badoche-Jacquet et al. | |
| 6,474,153 B1 | 11/2002 | Yamanaka et al. | |
| 7,114,388 B1 | 10/2006 | French et al. | |
| 7,249,502 B2 * | 7/2007 | Luukkala et al. | 73/170.17 |
| 7,268,691 B2 * | 9/2007 | Koors et al. | 340/601 |
| 7,446,427 B2 | 11/2008 | Parker et al. | |
| 7,613,590 B2 * | 11/2009 | Brown | 702/188 |
| 8,028,572 B2 * | 10/2011 | Matsuda et al. | 73/170.17 |
| 2007/0271048 A1 * | 11/2007 | Feist et al. | 702/65 |
| 2008/0117950 A1 * | 5/2008 | Braatz | 374/141 |
| 2008/0229839 A1 * | 9/2008 | Chakraborty | 73/724 |
| 2009/0251437 A1 * | 10/2009 | Hung et al. | 345/174 |
| 2009/0292470 A1 | 11/2009 | Curry | |

FOREIGN PATENT DOCUMENTS

FR 2401431 A1 3/1979

OTHER PUBLICATIONS

Wikipedia® Rain Gauge http://en.wikipedia.org/wiki/Rain_gauge accessed May 28, 2010 (7 pages).
Belfort Instrument-Precipitation http://www.belfortinstrument.com/content/precipitation_s5780_5915.cfm accessed Jul. 30, 2010 (2 pages).
Steinar Bakkehoi; Forland, Eirik J. and Oien, Kjell; An Automatic Precipitation Gauge Based on Vibrating-Wire Strain Gauges; GEONOR; Presented to "Nordic Hydrology" 1985 p. 193-202 (10 pages).

* cited by examiner

*Primary Examiner* — Sujoy Kundu
*Assistant Examiner* — Ivan Rabovianski
(74) *Attorney, Agent, or Firm* — Heslin Rothenberg Farley & Mesiti P.C.

(57) ABSTRACT

A sensing device for use in determining at least one attribute of a weather event comprising a plurality of elements. The sensing device can comprise a pressure sensitive surface. The pressure sensitive surface can comprise a pressure sensor. In response to receiving pressure applied by one of the elements, the pressure sensor can generate an output. A first attribute of the at least one attribute of the weather event is determinable at least in part from the output. A system, method, and computer program product for use in determining the at least one attribute are also provided.

2 Claims, 18 Drawing Sheets

| ATTRIBUTES 200 | SENSING DEVICE 10 |
|---|---|
| AVERAGE DISTANCE BETWEEN ELEMENTS | 26mm |
| AVERAGE TIME BETWEEN IMPACTS | .03 sec |
| FIRST IMPACT TIME | 10:00 am |
| LAST IMPACT TIME | 10:30 am |
| DURATION | 30 min |
| NUMBER OF PRESSURE-APPLYING ELEMENTS | 60,000 |
| DENSITY | 15,000 elements/m$^2$ |
| CHARACTER | LIGHT |
| AVERAGE SIZE OF ELEMENTS | LARGE |

FIG. 5

| ATTRIBUTES 200 | SENSING DEVICE 10, 10a | SENSING DEVICE 10, 10a |
|---|---|---|
| 202 → AVERAGE DISTANCE BETWEEN ELEMENTS | 26mm | 15mm |
| 204 → AVERAGE TIME BETWEEN IMPACTS | .03 sec | .01 sec |
| 206 → FIRST IMPACT TIME | 10:00 am | 9:59 am |
| 208 → LAST IMPACT TIME | 10:30 am | 10:31 am |
| 210 → DURATION | 30 min | 32 min |
| 212 → NUMBER OF PRESSURE-APPLYING ELEMENTS | 60,000 | 192,000 |
| 214 → DENSITY | 15,000 elements/m² | 48,000 elements/m² |
| 216 → CHARACTER | LIGHT | HEAVY |
| 218 → AVERAGE SIZE OF ELEMENTS | SMALL | LARGE |

FIG. 8

SENSING DEVICE FOR DETERMINING WEATHER EVENT ATTRIBUTES

TECHNICAL FIELD

The present invention is directed to a sensing device, and more particularly to a sensing device for use in determining at least one attribute of a weather event.

BACKGROUND

A weather event can have a myriad of associated attributes. For example, attributes associated with rainfall include character, amount, duration, and infiltration. The character of rainfall can be, e.g., light, medium, or heavy. The amount of rainfall can be measured by the depth of the rain accumulating in, e.g., an open square container that is 1 meter wide, 1 meter long, and 0.5 meters high. If rain accumulates in the box to a depth of 35 millimeters, then the amount of rainfall is 35 millimeters per square meter. The duration of the rainfall is the time of the rainfall from start to finish, e.g., 3.5 hours.

Infiltration refers to the physical process involving movement of rain water through the boundary area where the atmosphere interfaces with the soil. This movement is governed by surface soil conditions, such as porosity and permeability. Typically, the rate at which rain water infiltrates the soil depends on the puddling of the water at the soil surface by the impact of raindrops, the texture and structure of the soil, the initial soil moisture content, the decreasing water concentration as the rain water moves deeper into the soil, filling of the pores in the soil matrices, changes in the soil composition, and the swelling of the wetted soils that in turn close cracks in the soil. As rain falls, rain water reaching the ground surface infiltrates into the soil until the infiltration capacity of the soil is exceeded. Thereafter, surface puddles, ditches, and other depressions are filled, and then surface runoff is generated. Surface runoff is the water flow that occurs when soil is infiltrated to full capacity, and excess water flows over the land.

SUMMARY

According to one embodiment of the present invention, a sensing device for use in determining at least one attribute of a weather event comprising a plurality of elements. The sensing device comprises a pressure sensitive surface comprising a pressure sensor for generating an output in response to receiving pressure applied by one of the elements. A first attribute of the at least one attribute of the weather event is determinable at least in part from the output.

According to another embodiment of the present invention, a system for use in determining at least one attribute of a weather event comprising a plurality of elements. The system comprises a pressure sensor for generating an output in response to receiving pressure applied by one of the elements, and a computer system for receiving the output. The computer system is operative to determine a first attribute of the at least one attribute of the weather event at least in part from the output.

According to another embodiment of the present invention, a method for determining at least one attribute of a weather event comprising a plurality of elements. The method comprises receiving, using a processor communicatively coupled to a pressure sensor, an output generated by the pressure sensor in response the pressure sensor receiving pressure applied by one of the elements and determining, using the processor, a first attribute of the at least one attribute of the weather event at least in part from the output.

According to another embodiment of the present invention, a computer program product for determining at least one attribute of a weather event comprising a plurality of elements. The computer program product comprises a computer readable storage medium, first program instructions to receive an output generated by a pressure sensor in response to the pressure sensor receiving pressure applied by one of the elements, and second program instructions to determine a first attribute of the at least one attribute at least in part from the output. The first and second program instructions are stored on the computer readable storage medium.

BRIEF DESCRIPTION OF THE SEVERAL VIEWS OF THE DRAWINGS

FIG. 5 is a chart of exemplary attributes of a weather event according to an embodiment of the present invention.

FIG. 8 is a chart of exemplary attributes of a weather event according to an embodiment of the present invention.

DETAILED DESCRIPTION

Figure 1:
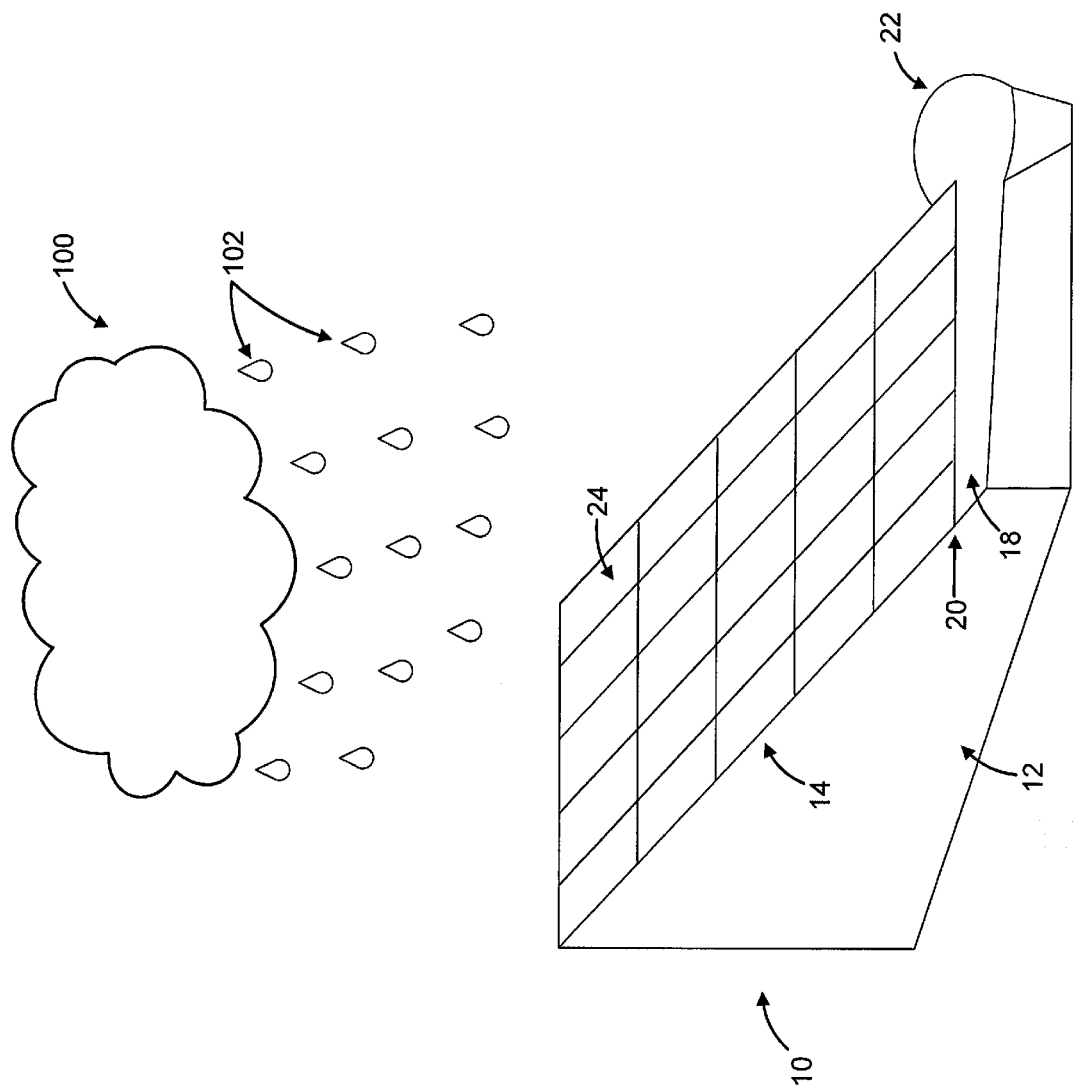
FIG. 1 is a perspective view of a sensing device according to an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the present invention provide for a system for use in determining at least one attribute of a weather event comprising a plurality of elements. The system can comprise a pressure sensor for generating an output in response to receiving pressure applied by one of the elements, and a computer system for receiving the output. The computer system can be operative to determine a first attribute of the at least one attribute of the weather event at least in part from the output. In one embodiment, the first attribute can be a density of the weather event. The density can be determined by dividing a total number of outputs, including the output, by a surface area of the pressure sensor. The total number of outputs can represent the number of the elements of the weather event applying pressure on the pressure sensor. In another embodiment, the pressure sensor can be a first pressure sensor and a second pressure sensor.

The system can be utilized to determine varying densities of the weather event throughout an area, such as an agricultural field with growing crops. For example, in a weather event of rainfall having elements of raindrops, few raindrops may apply pressure to the first pressure sensor, deployed in the west side of the area during the duration of the rainfall, while many raindrops may apply pressure to the second pressure sensor, deployed in the east side of the area during the duration of the rainfall. The low density measured over the west side of the area can signify a character of light rain, and the high density measured over the east side of the area can signify a character of heavy rain. Heavy rainfall can have big drops that fall with more force onto the surface of the soil. In fine textured soil, the big drops can cause soil aggregates to break down rapidly into fine particles that seal the soil surface. Infiltration is then reduced, providing less natural irrigation for crops in the east side of the area, and surface runoff is increased. Light rainfall can have finer drops resulting in less sealing of the soil surface. As a result, the rain water infiltrates more easily, providing more natural irrigation for crops in the west side of the area, and surface runoff is limited. Thus, a farmer utilizing the above exemplary data provided by the system according to embodiments of the present invention may decide to advantageously conserve water by irrigating crops growing in only the east side of the area rather than in the entire area, as the light rainfall naturally irrigated the crops growing in the west side of the area.

In systems known to the present inventors, a tipping bucket rain gauge can measure rainfall intensity. An observer can determine the character of the rainfall from the rainfall intensity. Rainfall intensity is measured by the amount of rainfall divided by the duration. For example, rainfall having an amount of 35 millimeters per square meter and a duration of 3.5 hours has an intensity of 10 millimeters per hour and can be characterized as a light rainfall. Rainfall having the same amount, 35 millimeters per square meter, and lasting only 1 hour has a higher intensity of 35 millimeters per hour and can be characterized as a heavy rainfall.

A typical tipping bucket rain gauge used to determine rainfall intensity consists of a large cylinder set into the ground. A funnel at the top of the cylinder collects and channels precipitation into one of two small buckets or levers that are balanced in the same manner as a scale. After an amount of precipitation equal to 0.2 millimeters falls, the lever tips, and an electrical signal is sent to a recorder. The recorder consists of a pen mounted on an arm attached to a geared wheel that moves once with each signal sent from the collector. When the wheel turns, the pen arm moves either up or down, leaving a trace on a graph and at the same time making a loud "click." Rainfall intensity can be determined from the total amount of rainfall that the gauge collects in a set period, e.g., one hour, divided by the number of "clicks" in, e.g., a 10 minute period. However, the gauge can underestimate the amount of rainfall if the rainfall stops before the tipping bucket lever has tipped. When the next period of rain begins, it may take no more than one or two raindrops to tip the lever. The gauge would then indicate that 0.2 millimeters of rain has fallen, when in fact only one or two raindrops have fallen. This inaccurate measurement of the amount of rainfall can result in an inaccurate calculation of rainfall intensity, and can thereby lead to an inaccurate determination of rainfall character.

Other types of rain gauges known to the present inventors also tend to underestimate the amount of rainfall. For example, in weighting precipitation gauges comprising a storage bin, and in optical rain gauges comprising a row of rainfall collection funnels, raindrops can stick to the sides of the storage bin or funnel, respectively. When this occurs, smaller rainfall amounts such as 0.25 millimeters may be recorded as a trace. As embodiments of the present invention can facilitate determining the character of the weather event from a density measurement rather than an amount measurement, the determination of character can advantageously be more accurate.

Figure 2:
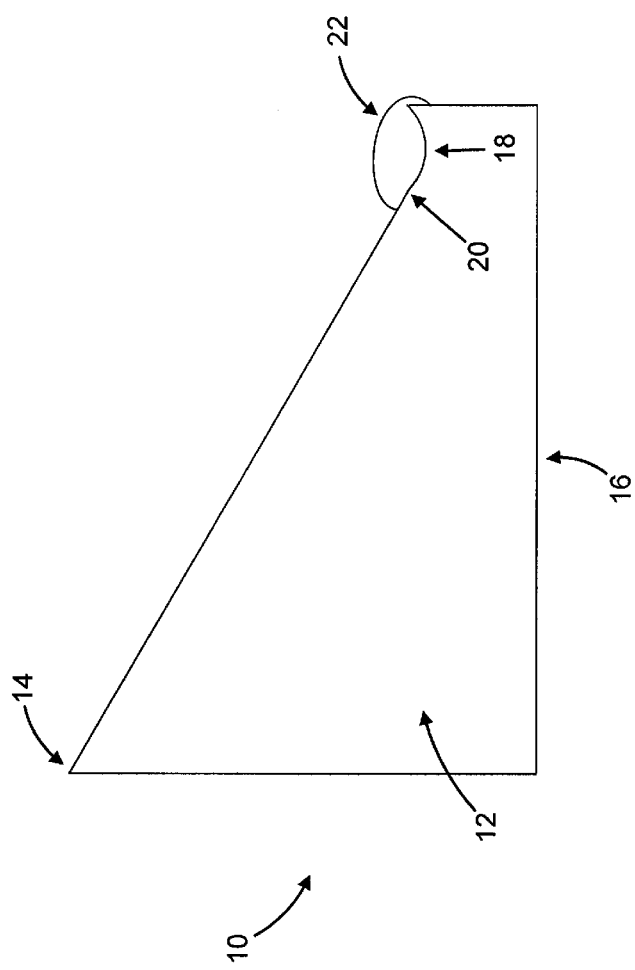
FIG. 2 is a side view of a sensing device according to an embodiment of the present invention.

Referring now to FIGS. 1-2, a sensing device 10 for use in determining at least one attribute of a weather event 100 according to embodiments of the present invention is shown. Although weather event 100 and plurality of elements 102 of weather event 100 are depicted as rainfall and raindrops, respectively, one of skill in the art will appreciate that weather event 100 can be any type of weather event having elements that can exert pressure on sensing device 10. For example, weather event 100 and elements 102 can be a hail storm and hail, respectively, or a hurricane and wind gusts, respectively. Sensing device 10 can comprise a base 12 having a pressure sensitive surface 14 and a bottom surface 16. Pressure sensitive surface 14 can be inclined with respect to bottom surface 16 so that elements 102 can flow downward from pressure sensitive surface 14 into accumulator 18. Accumulator 18 can extend along a front edge 20 of pressure sensitive surface 14 and can decline toward bottom surface 16 so that elements 102 can be collected in collector 22. Collector 22 can be attached to base 12 and can be any type of device for measuring an amount of weather event 100, e.g., an amount of rainfall. For example, collector 22 can be a tipping bucket gauge, a weighting precipitation gauge, or an optical rain gauge.

Figure 3:
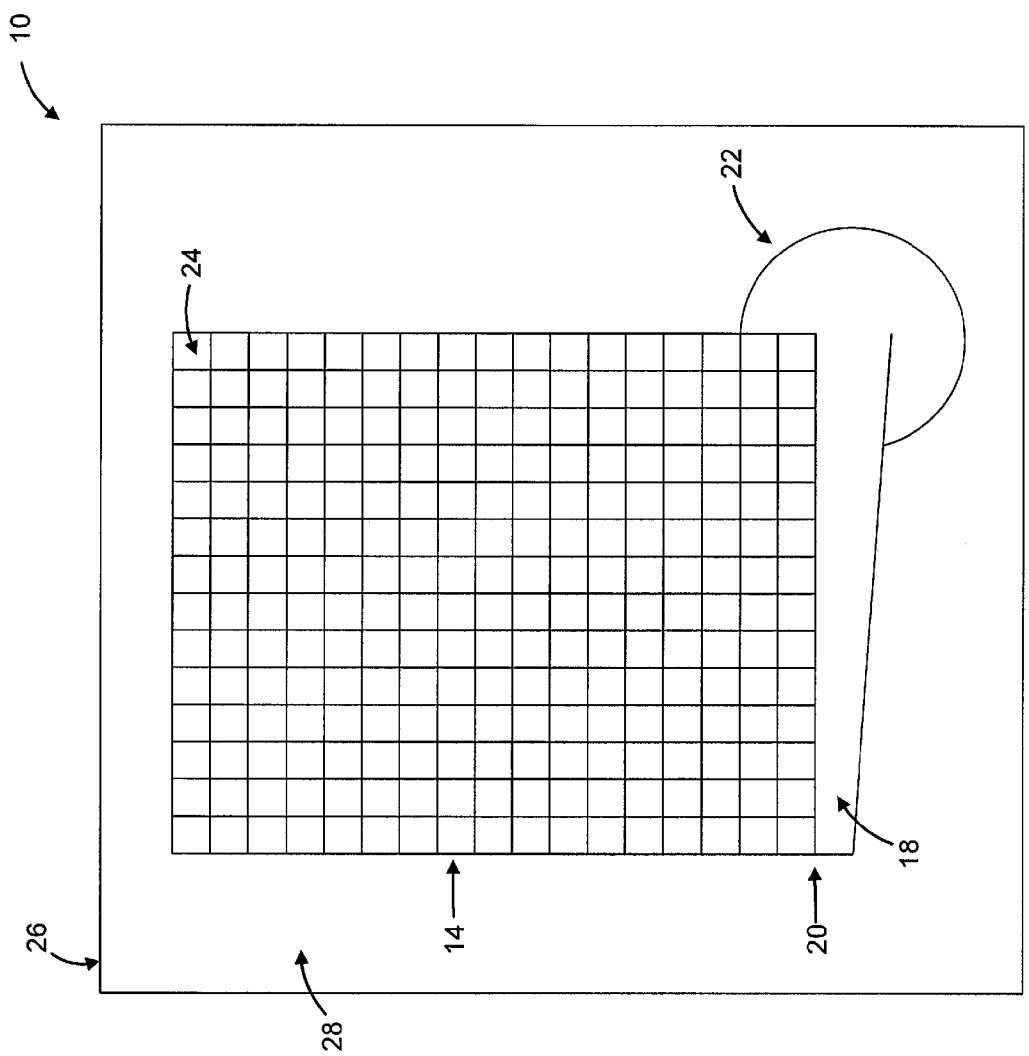
FIG. 3 is a top view of a sensing device according to an embodiment of the present invention.

Pressure sensitive surface 14 can comprise at least one pressure sensor 24. Pressure sensor 24 can be any type of device that measures z-axis pressure, including, but not limited to, a strain gauge such as V-Link®, SG-Link®, SG-Link OEM®, G-Link®, TC-Link®, or TC-Link®-1CH available from MicroStrain®, Inc. of Williston, Vt., a touchpad such as VersaPad™ available from Interlink Electronics, Inc. of Camarillo, Calif., or a carbon nanotube (CNT) sensor. In response to receiving pressure applied by one of elements 102, pressure sensor 24 can generate an output (not shown). A first attribute of at least one attribute 200 of weather event 100, as shown in FIG. 5, can be determined at least in part from the output. As shown in FIG. 3, sensing device 10 can further comprise a shelter 26 having an open top 28 for exposing pressure pressure sensor 24 to elements 102. Shelter 26 can advantageously shield the remaining components of sensing device 10 in, e.g., windy environments when sensing device 10 is being used to determine at least one attribute of a weather event 100 of rainfall.

Figure 4:
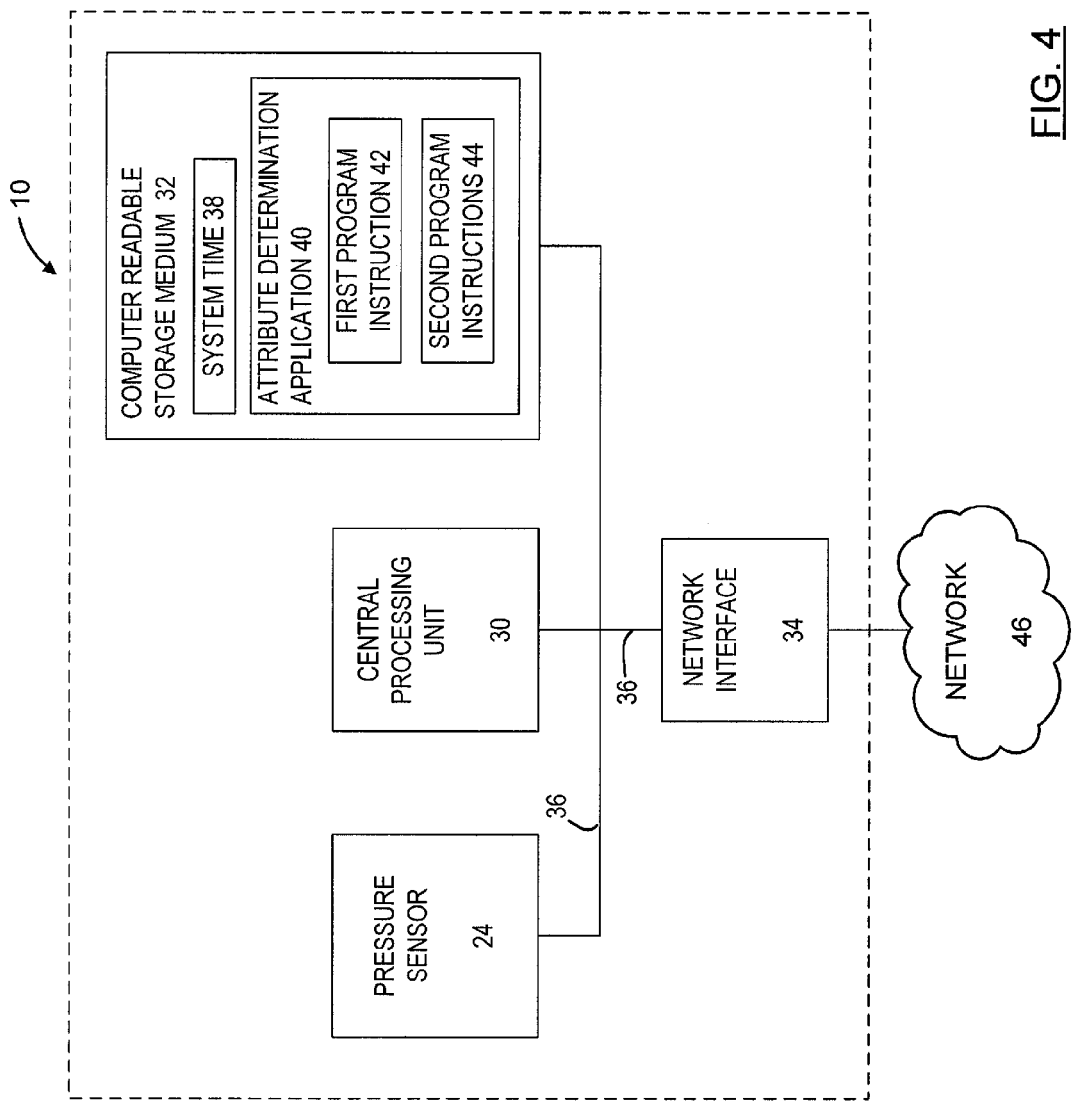
FIG. 4 is a hardware overview of a sensing device according to an embodiment of the present invention.

FIG. 4 is a block diagram of the internal circuitry of a sensing device 10 according to one embodiment of the present invention. Sensing device 10 can comprise pressure sensor 24, processor 30, computer readable storage medium 32, and network interface 34. Processor 30 can control operation of sensing device 10. Although processor 30 is shown as a central processing unit (CPU), processor 30 can alternatively include state machine circuitry or other suitable components capable of controlling operation of sensing device 10 as described herein. Processor 30 can communicate with pressure sensor 24, computer readable storage medium 32, and network interface 34 over one or more buses 36. Although FIG. 4 shows processor 30, pressure sensor 24, computer readable storage medium 32, and network interface 34 as discrete components, this need not be the case. For example, one or more of these components can be contained in a single integrated circuit (IC) or other component. Similarly, the herein described functions of these components can be distributed across additional components (e.g., multiple processors or other components).

Processor 30 can communicate with computer readable storage medium 32. Computer readable storage medium 32 may be, for example, but not limited to, an electronic, magnetic, optical, electromagnetic, infrared, or semiconductor system, apparatus, or device, or any suitable combination of the foregoing. More specific examples (a non-exhaustive list) of computer readable storage medium 32 include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Computer readable storage medium 32 may be any tangible medium that can contain, or store a program for use by or in connection with an instruction execution system, apparatus, or device. Computer readable storage medium 32 can be used for storage of software (or firmware) instructions and configuration settings. System time 38 and attribute determination application 40 can be stored in computer readable storage medium 32. In one embodiment, processor 30 can be configured to utilize the network time protocol (NTP) to obtain system time 38 from a time server communicatively coupled to sensing device 10 via network 46 and to store system time 38 in computer readable storage medium 32. In another embodiment, sensing device 10 can comprise a battery (not shown) such as a CMOS battery, and processor 30 can be configured to obtain system time 38 from the battery and to store system time 38 in computer readable storage medium 32. Processor 30 can be configured to obtain system time 38 in response to pressure sensor 24 receiving pressure applied by one of elements 102.

Attribute determination application 40 can have first program instructions 42 to receive the output generated by pressure sensor 24. Attribute determination application 40 can further have second program instructions 44 to determine a first attribute of at least one attribute 200 of weather event 100 at least in part from the output. In one embodiment, a computer program product for determining at least one attribute 200 of weather event 100 can comprise computer readable storage medium 32, wherein first program instructions 42 and second program instructions 44 can be stored on computer readable storage medium 32. In one embodiment, second program instructions 44 can determine density 214, as shown in FIG. 5.

Network interface 34 can provide a physical interface to network 46. Network interface 34 can be any type of adapter that provides an interface between sensing device 10 and network 46, such as a modem that can be connected to a transmission system such as a telephone line, an Ethernet adapter, or a Token Ring adapter.

FIG. 5 shows a table having a first column of exemplary attributes 200 of weather event 100 and a second column of exemplary values 48 of attributes 200 that a sensing device 10 according to one embodiment of the present invention can determine. Attributes 200 can comprise an average distance 202 between elements 102 applying pressure on pressure sensor 24, an average time 204 between elements 102 applying pressure on pressure sensor 24, an first element impact time 206 of a first of elements 102 applying pressure on pressure sensor 24, a last element impact time 208 of a last of elements 102 applying pressure on pressure sensor 24, a duration 210 of weather event 100, a number 212 of elements 102 applying pressure on pressure sensor 24, a density 214 of weather event 100, a character 216 of weather event 100, and an average size 218 of elements 102.

As an example of average distance 202, if a first element of elements 102 applies pressure on a first sensor of at least one pressure sensor 24, a second element of elements 102 applies pressure on a second sensor of at least one pressure sensor 24 located 4 millimeters from the first pressure sensor, and a third element of elements 102 applies pressure on a third sensor of at least one pressure sensor 24 located 6 millimeters from the first sensor and 4 millimeters from the second sensor, then average distance 202 can be 4⅔ millimeters. Processor 30 can capture system time 38 in response to pressure sensor 24 receiving pressure applied by a first element of elements 102 to determine first element impact time 206. Processor 30 can also capture system time 38 in response to pressure sensor 24 receiving pressure applied by a last element of elements 102 to determine last element impact time 208. Processor 30 can further capture system time 38 each time pressure sensor 24 receives pressure applied by one of elements 102 to determine average time 204 between elements 102. Processor 30 can store the captured system time 38 in computer readable storage medium 32.

Duration 210 can be calculated as the difference between last element impact time 208 and first element impact time 206. Density 214 can be determined by dividing a total number of outputs, including the output, by a surface area of pressure sensor 24. The total number of outputs can represent the number of elements 102 of weather event 100 applying pressure on pressure sensor 24. Alternatively, density 214 can be determined by dividing the total number of outputs, including the output, by a surface area of pressure sensitive surface 14. Character 216 can be determined from density 214, e.g., a high density 214 can indicate heavy rainfall, and a low density 214 can indicate light rainfall. Average size 218 of elements 102 can be determined from the average amount of pressure that elements 102 exert on pressure sensor 24. For example, large raindrops can exert more pressure on pressure sensor 24 than light raindrops. Alternatively, average size 218 can be determined from the average surface area of the impact of elements 102 on pressure sensor 24. For example, heavy raindrops can impact a larger surface area of pressure sensor 24 than light raindrops. Sensing device 10 can generate exemplary values 48 in a real-time manner or in response to the completion of weather event 100.

Figure 6:
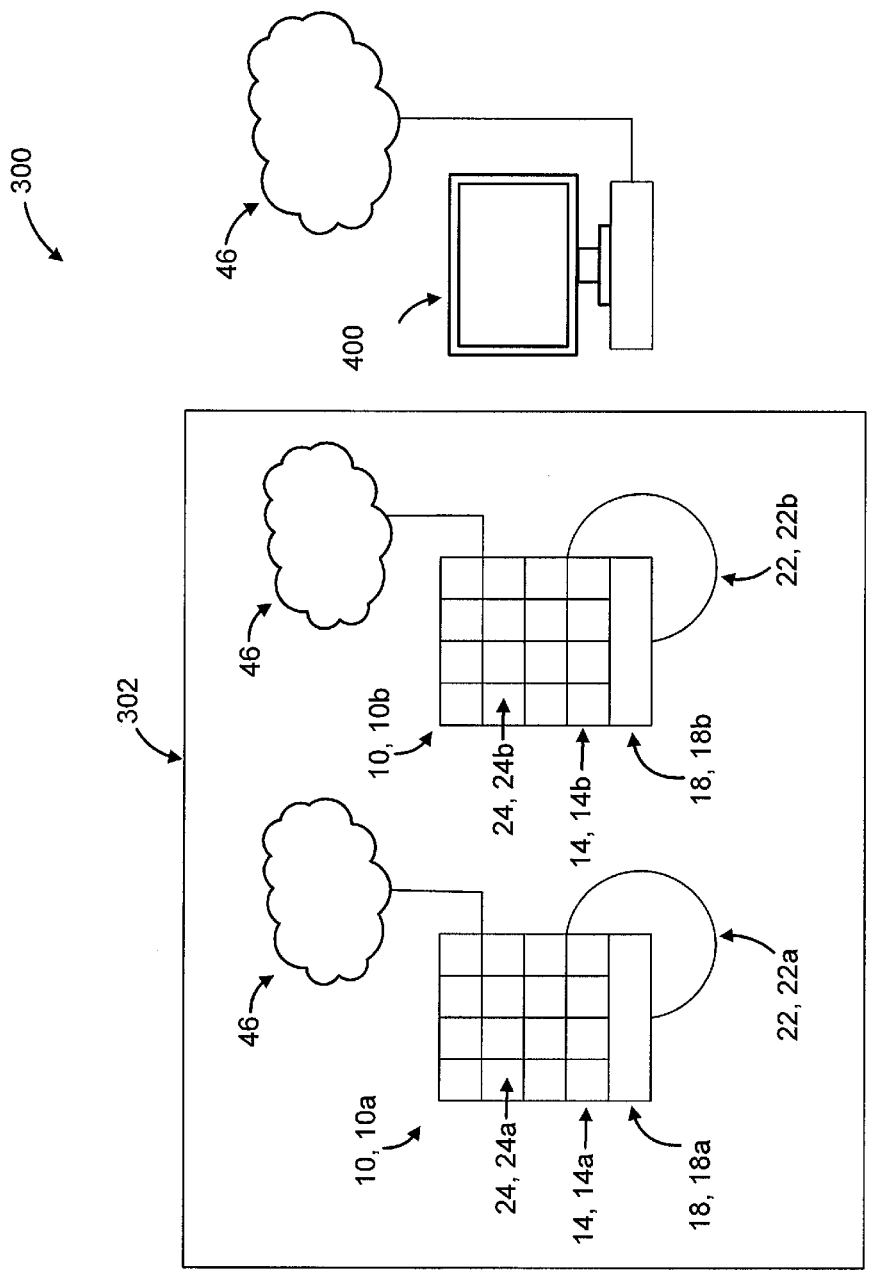
FIG. 6 is an illustration of a system according to an embodiment of the present invention.

Referring now to FIG. 6, a system 300 for use in determining at least one attribute 200 of weather event 100 according to one embodiment of the invention is shown. System 300 can comprise at least one pressure sensor 24 and a computer system 400. Pressure sensor 24 can generate an output in response to receiving pressure applied by one of elements 102, and computer system 400 can receive the output, e.g., via network 46. In the embodiment shown, at least one pressure sensor 24 is a first sensor 24, 24a and a second sensor 24, 24b, which are part of sensing devices 10, 10a and 10, 10b, respectively. Sensing devices 10, 10a and 10, 10b deployed in western and eastern portions, respectively, of an area 302. Area 302 can be, e.g., an agricultural field, a rural area, an urban area, or a suburban area. Sensing devices 10, 10a and 10, 10b can be communicatively coupled to computer system 400 via network 46. Sensing devices 10, 10a and 10, 10b can each comprise pressure sensitive surfaces 14, 14a and 14, 14b, respectively, accumulators 18, 18a and 18, 18b, respectively, and collectors 22, 22a and 22, 22b, respectively. Pressure sensitive surfaces 14, 14a and 14, 14b can each comprise and pressure sensors 24, 24a and 24, 24b, respectively.

Figure 7:
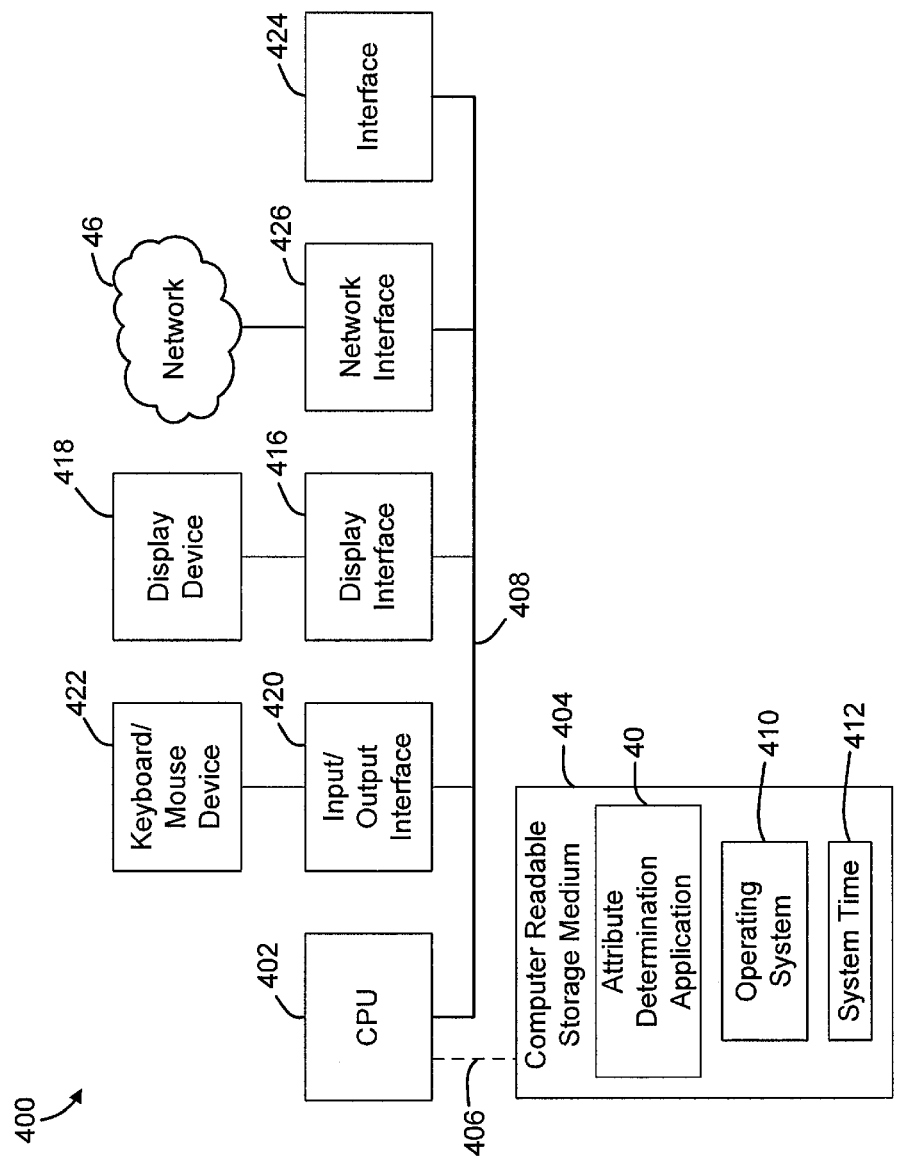
FIG. 7 is a hardware overview of a computer system according to an embodiment of the present invention.

FIG. 7 depicts a simplified block diagram of a computer system 400 suitable for implementing embodiments of system 300. Computer system 400 can be a workstation, server, mainframe computer, notebook or laptop computer, desktop computer, mobile phone, wireless device, set-top box, or the like. Other possibilities for computer system 400 are possible, including a computer having capabilities other than those ascribed herein and possibly beyond those capabilities. In the depicted embodiment, computer system 400 has CPU 402, which is a programmable processor for executing programmed instructions stored in computer readable storage medium 404. CPU 402 can be a reduced instruction set (RISC) microprocessor such as an IBM® PowerPC® processor, an x86 compatible processor such as an Intel® Pentium® processor, an Advanced Micro Devices® Athlon® processor, or any other suitable processor. IBM and PowerPC are trademarks or registered trademarks of International Business Machines Corporation in the United States, other countries, or both. Intel and Pentium are trademarks or registered trademarks of Intel Corporation or its subsidiaries in the United States, other countries, or both. Advanced Micro Devices and Athlon are trademarks or registered trademarks of Advanced Micro Devices, Inc. or its subsidiaries in the United States, other countries, or both. In other embodiments, CPU 402 may comprise one or more processors distributed across one or more locations, e.g., on a client and server.

CPU 402 is connected to computer readable storage medium 404 either through a dedicated system bus 406 and/or a general system bus 408. Computer readable storage medium 404 may be, for example, but not limited to, an electronic, magnetic, optical, electromagnetic, infrared, or semiconductor system, apparatus, or device, or any suitable combination of the foregoing. More specific examples (a non-exhaustive list) of computer readable storage medium 404 include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Computer readable storage medium 404 may be any tangible medium that can contain, or store a program for use by or in connection with an instruction execution system, apparatus, or device. Computer readable storage medium 404 can be used for storage of software (or firmware) instructions and configuration settings. For example, operating system 410, system time 412, and attribute determination application 40 can be stored in computer readable storage medium 404. It is appreciated that embodiments of the present invention can be implemented in a distributed computing environment having a plurality of computers communicating via network 46.

Operating system 410 can provide functions such as device interface management, memory management, and multiple task management. Operating system 410 can be a Unix based operating system such as the IBM® AIX® operating system, a non-Unix based operating system such as an operating system falling within the Microsoft® Windows® family of operating systems, a network operating system such as Sun Microsystems® JavaOS®, or any other suitable operating system. IBM and AIX are trademarks or registered trademarks of International Business Machines Corporation in the United States, other countries, or both. Microsoft and Windows are trademarks or registered trademarks of Microsoft Corporation in the Untied States, other countries, or both. Sun Microsystems and Java and all Java-based trademarks and logos are trademarks of Sun Microsystems, Inc. in the United States, other countries, or both. CPU 402 can be suitably programmed to read, load, and execute instructions of operating system 410. Other programs (not shown) can include server software applications in which network interface 426 can interact with the server software application to enable computer system 400 to function as a network server via network 46.

General system bus 408 can support transfer of data, commands, and other information between various subsystems of computer system 400. While shown in simplified form as a single bus, general system bus 408 can be structured as multiple buses arranged in hierarchical form. Display interface 416 can support video display device 418, which can be a cathode-ray tube display or a display based upon other suitable display technology. The input/output interface 420 can support devices suited for input and output, such as keyboard or mouse device 422, and a disk drive unit (not shown).

Interface 424 can be used for operationally connecting many types of peripheral computing devices to computer system 400 via general system bus 408, such as printers, bus adapters, and other computers. Network interface 426 can provide a physical interface to network 46. Network interface 426 can be any type of adapter that provides an interface between computer system 400 and network 46, such as a modem that can be connected to a transmission system such as a telephone line, an Ethernet adapter, or a Token Ring adapter. In one embodiment, CPU 402 can be configured to utilize the network time protocol (NTP) to obtain system time 412 from a time server communicatively coupled to computer system 400 via network 46 and to store system time 412 in computer readable storage medium 404. In another embodiment, computer system 400 can comprise a battery (not shown) such as a CMOS battery, and CPU 402 can be configured to obtain system time 412 from the battery and to store system time 412 in computer readable storage medium 404. CPU 402 can be configured to capture system time 412 in response to receiving output from sensing device 10, 10a or 10, 10b. Computer system 400 can be connected to another network server via a LAN using an appropriate network protocol and the network server that can in turn be connected to the Internet.

FIG. 8 is a table showing exemplary attributes 200 of weather event 100 in a first column and first exemplary values 304 of attributes 200 in a second column, and second exemplary values 306 of attributes 200 in a third column. System 300 can determine first exemplary values 304 and second exemplary values 306 and can output first exemplary values 304 and/or second exemplary values 306 to, e.g., display device 418 or to a printer connected to interface 424 of computer system 400. With reference to FIGS. 6 and 8, in one embodiment of system 300, sensing device 10, 10a can generate first exemplary values 304 in a real-time manner or in response to the completion of weather event 100, sensing device 10, 10b can generate second exemplary values 306 in a real-time manner or in response to the completion of weather event 100, and sensing devices 10, 10a and 10, 10b can transmit first exemplary values 304 and second exemplary values 306, respectively, to computer system 400 via network 46. In another embodiment of system 300, sensing devices 10, 10a and 10, 10b can transmit each output generated by pressure sensors 24, 24a and 24, 24b, respectively, to computer system 400 via network 46 in a real-time manner or in response to the completion of weather event 100, and computer system 400 can process each output received from sensing devices 10, 10a and 10, 10b to generate first exemplary values 304 and second exemplary values 306, respectively, in a real-time manner or in response to the completion of weather event 100.

As shown in FIG. 8, first exemplary value 304 of density 214 is 15,000 elements per square meter, first exemplary value 304 of character 216 is light, and first exemplary value 304 average size 218 of elements 102 is small, while second exemplary value 306 of density 214 is 48,000 elements per square meter, second exemplary value 306 of character 216 is heavy, and second exemplary value 306 average size 218 of elements 102 is large. If, for example, weather event 100 is rainfall, a farmer utilizing first exemplary values 304, second exemplary values 306, and/or the amount of weather event 100, e.g., an amount of rainfall, collected in collectors 22, 22a and 22, 22b may decide that the western portion of area of 302 has received sufficient natural irrigation through a low density, light rainfall with small raindrops, but the eastern portion of area 302 requires additional irrigation because the rainfall over the eastern portion of area 302 was a high density, heavy rainfall with large raindrops subject to less infiltration and more surface runoff. In this manner, the farmer can advantageously conserve water that he would have otherwise used to irrigate the eastern portion of area 302 absent the utilization of system 300.

Figure 9:
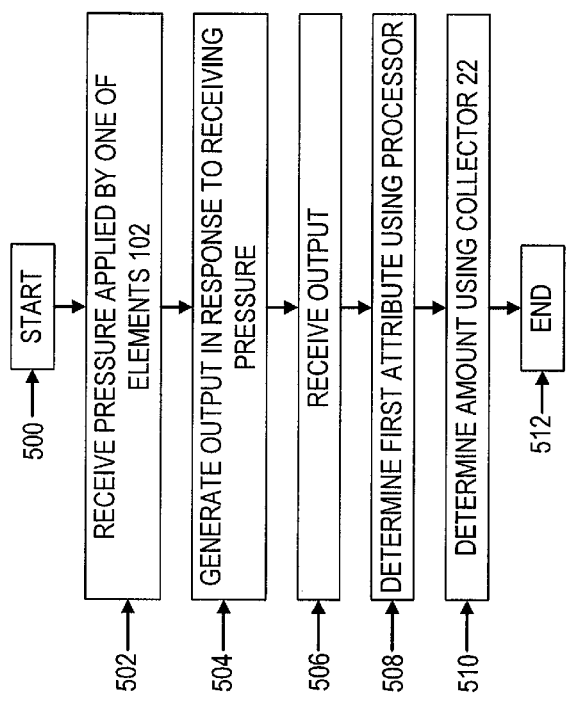
FIG. 9 is a flowchart for a method of analyzing a weather event according to an embodiment of the present invention.

FIG. 9 is a flowchart illustrating a method for determining at least one attribute 200 of weather event 100 according to an embodiment of the present invention. The method begins at block 500. At block 502, pressure sensor 24 can receive an amount of pressure applied by one of elements 102. At block 504, pressure sensor 24 can generate an output in response to receiving the amount of pressure. At block 506, the output from pressure sensor 24 can be received using a processor communicatively coupled to pressure sensor 24. In one embodiment, the processor can be processor 30 of sensing device 10. In another embodiment, the processor can be CPU 402 of computer system 400. At block 508, a first attribute of at least one attribute 200 can be determined at least in part from the output using the processor. In one embodiment, the first attribute can be density 214. In another embodiment, the first attribute can be character 216. At block 510, collector 22 can be utilized for determining an amount of weather event 100. Processing terminates at block 512.

As discussed above, in one embodiment, a computer program product for determining at least one attribute 200 of weather event 100 can comprise computer readable storage medium 32, wherein first program instructions 42 and second program instructions 44 can be stored on computer readable storage medium 32. The computer program product can be process software deployed from, e.g., a service provider server (not shown) to, e.g., sensing device 10 or computer system 400. While it is understood that the process software may be deployed by manually loading directly in client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by a bottom on the e-mail that executes a program that detaches the process software into a directory. Another alternative is to send the process software directly to a directory on the client computer hard drive. When there are proxy servers, the process will select the proxy server code, determine on which computers to place the proxy servers' code, transmit the proxy server code, then install the proxy server code on the proxy computer. The process software will be transmitted to the proxy server and then it will be stored on the proxy server.

Figure 10A:
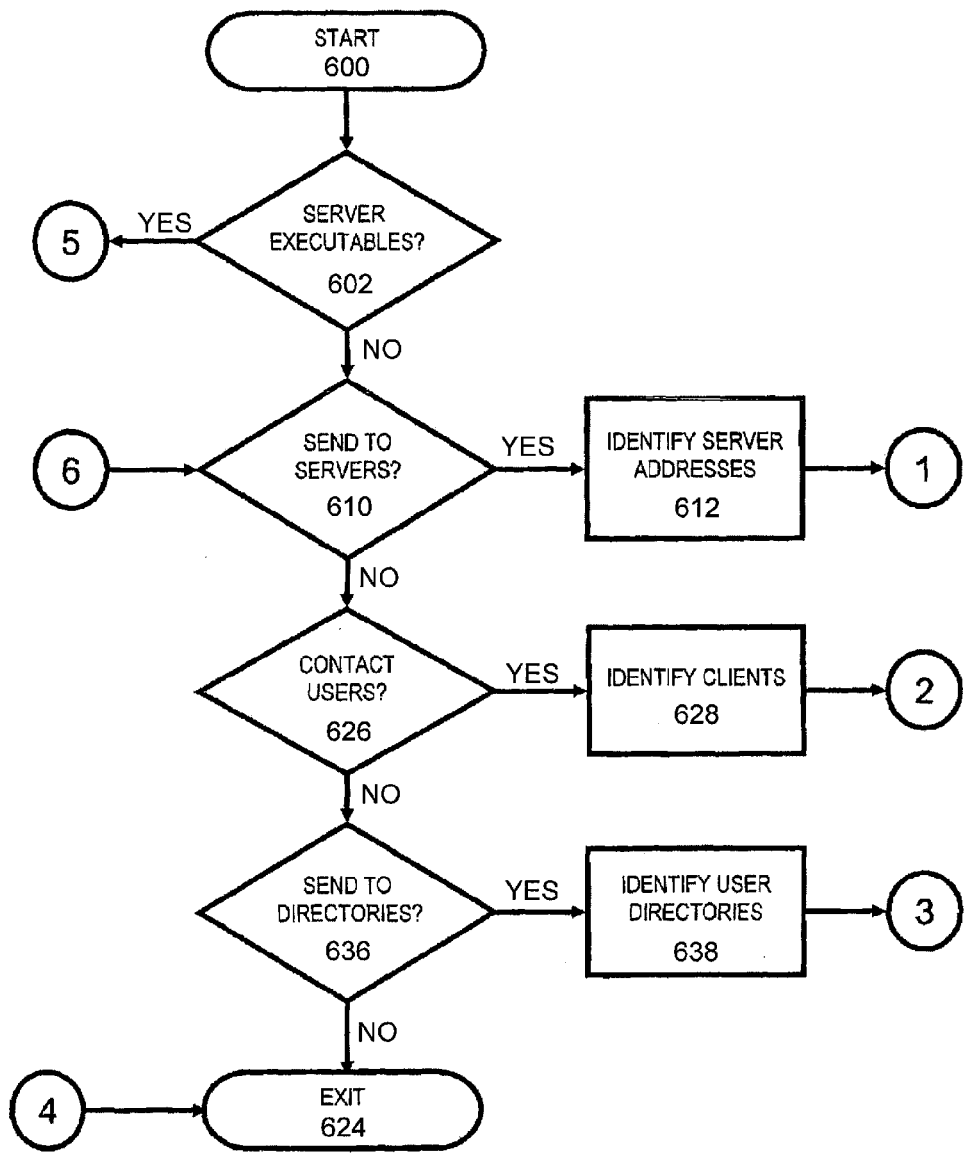
FIGS. 10a-b show a flowchart of steps taken to deploy process software according to an embodiment of the present invention.
Figure 10B:
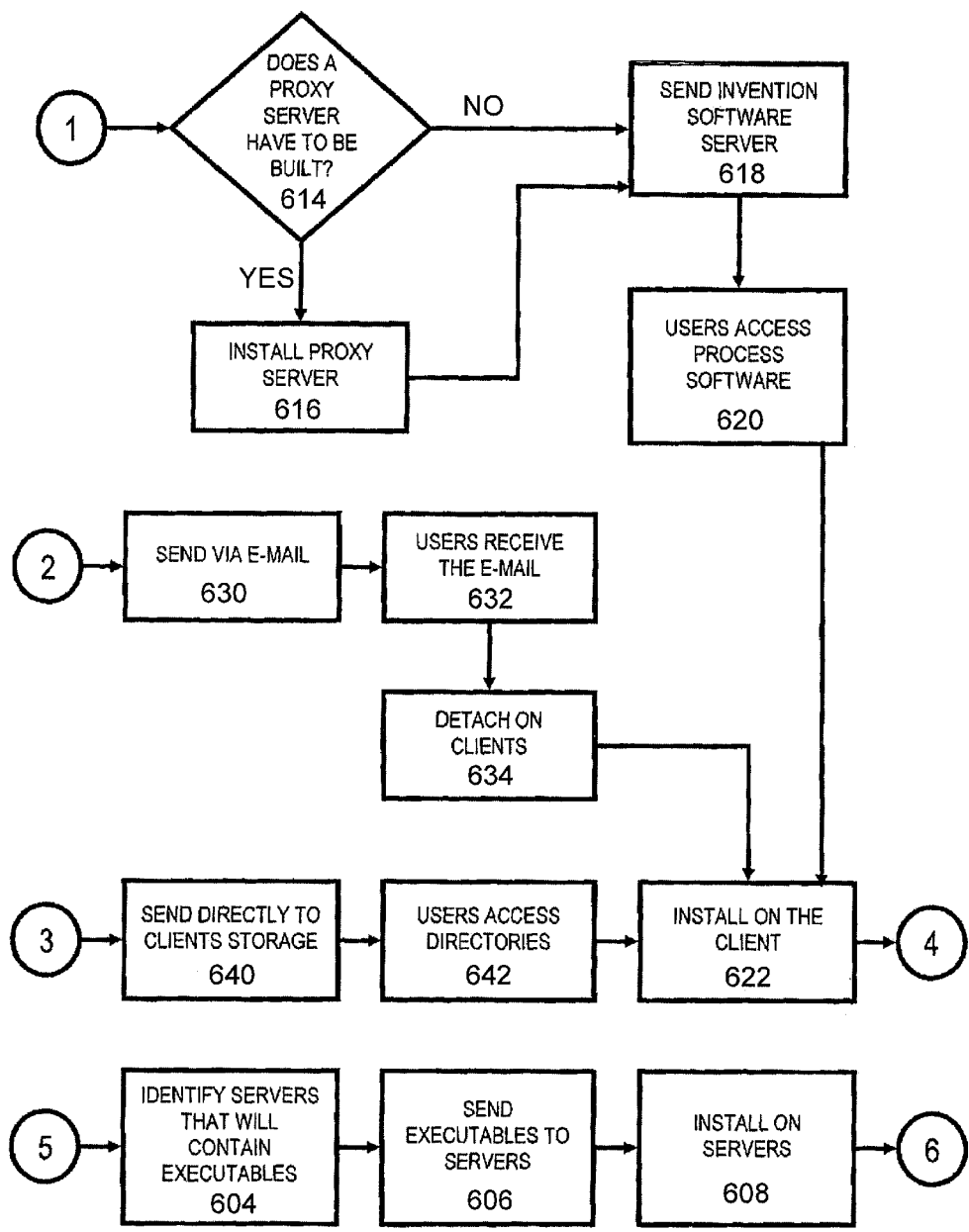

The process for such deployment is described in FIG. 10. Block 600 begins the deployment of the process software. The first thing is to determine if there are any programs that will reside on a server or servers when the process software is executed (block 602). If this is the case, then the servers that will contain the executables are identified (block 604). The process software for the server or servers is transferred directly to the servers' storage via File Transfer Protocol (FTP) or some other protocol or by copying through the use of a shared file system (block 606). The process software is then installed on the servers (block 608).

Next, a determination is made on whether the process software is to be deployed by having users access the process software on a server or servers (block 610). If the users are to access the process software on servers, then the server addresses that will store the process software are identified (block 612).

A determination is made if a proxy server is to be built (block 614) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 616). The process software is sent to the servers either via a protocol such as FTP or it is copied directly from the source files to the server files via file sharing (block 618). Another embodiment would be to send a transaction to the servers that contained the process software and have the server process the transaction, then receive and copy the process software to the server's file system. Once the process software is stored at the servers, the users via their client computers then access the process software on the servers and copy to their client computers' file systems (block 620). Another embodiment is to have the servers automatically copy the process software to each client and then run the installation program for the process software at each client computer. The user executes the program that installs the process software on his client computer (block 622) then exits the process (block 624).

At block 626, a determination is made whether the process software is to be deployed by sending the process software to users via e-mail. The set of users where the process software will be deployed are identified together with the addresses of the user client computers (block 628). The process software is sent via e-mail to each of the users' client computers (block 630). The users then receive the e-mail (block 632) and then detach the process software from the e-mail to a directory on their client computers (block 634). The user executes the program that installs the process software on his client computer (block 622) then exits the process (block 624).

Lastly, a determination is made on whether to the process software will be sent directly to user directories on their client computers (block 636). If so, the user directories are identified (block 638). The process software is transferred directly to the user's client computer directory (block 640). This can be done in several ways such as but not limited to sharing of the file system directories and then copying from the sender's file system to the recipient user's file system or alternatively using a transfer protocol such as FTP. The users access the directories on their client file systems in preparation for installing the process software (block 642). The user executes the program that installs the process software on his client computer (block 622) and then exits the process (block 624).

The process software may be deployed, accessed and executed through the use of a virtual private network (VPN), which is any combination of technologies that can be used to secure a connection through an otherwise unsecured or untrusted network. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs, the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 11A:
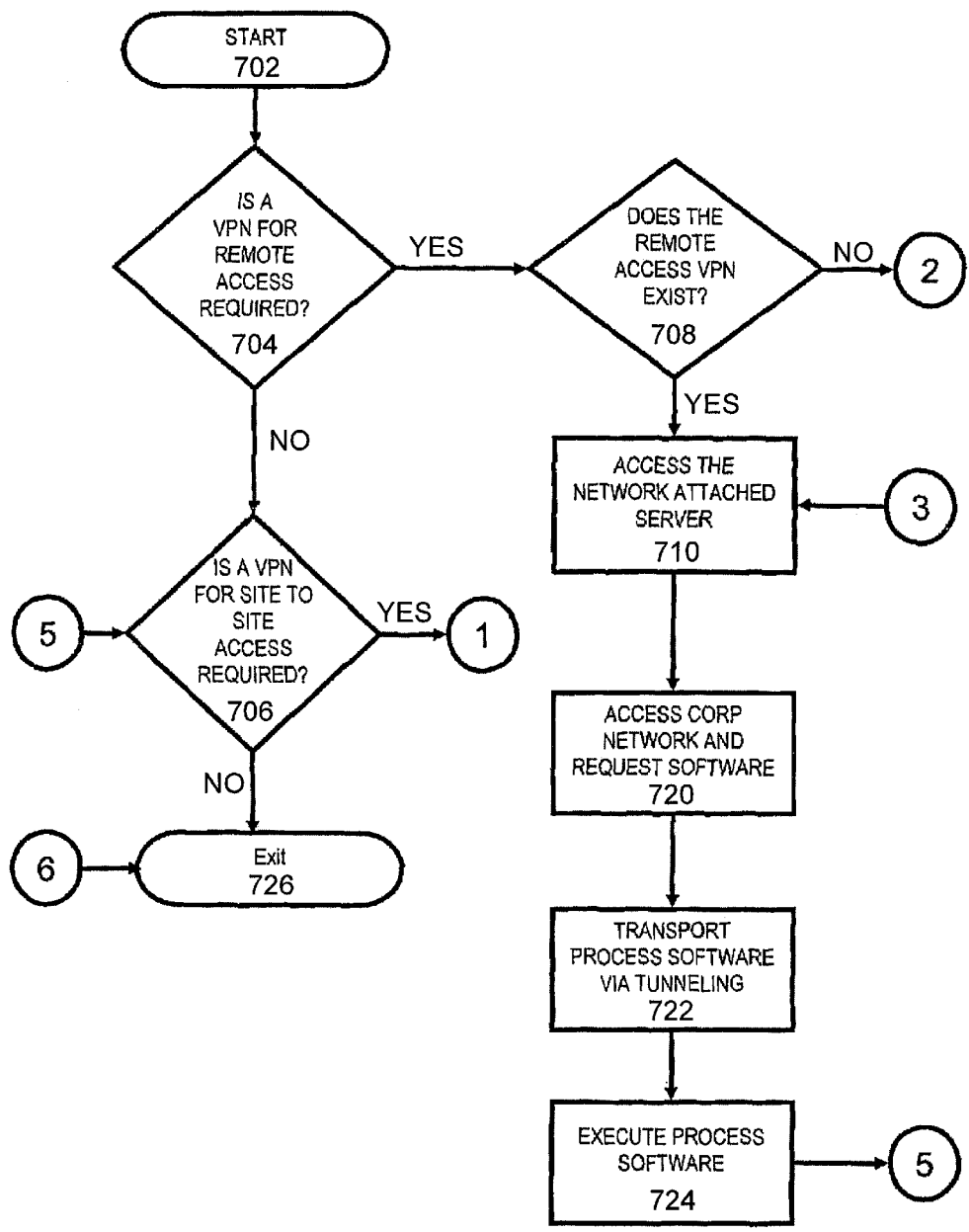
FIGS. 11a-c show a flowchart of steps taken to deploy in a Virtual Private Network (VPN) process software according to an embodiment of the present invention.
Figure 11B:
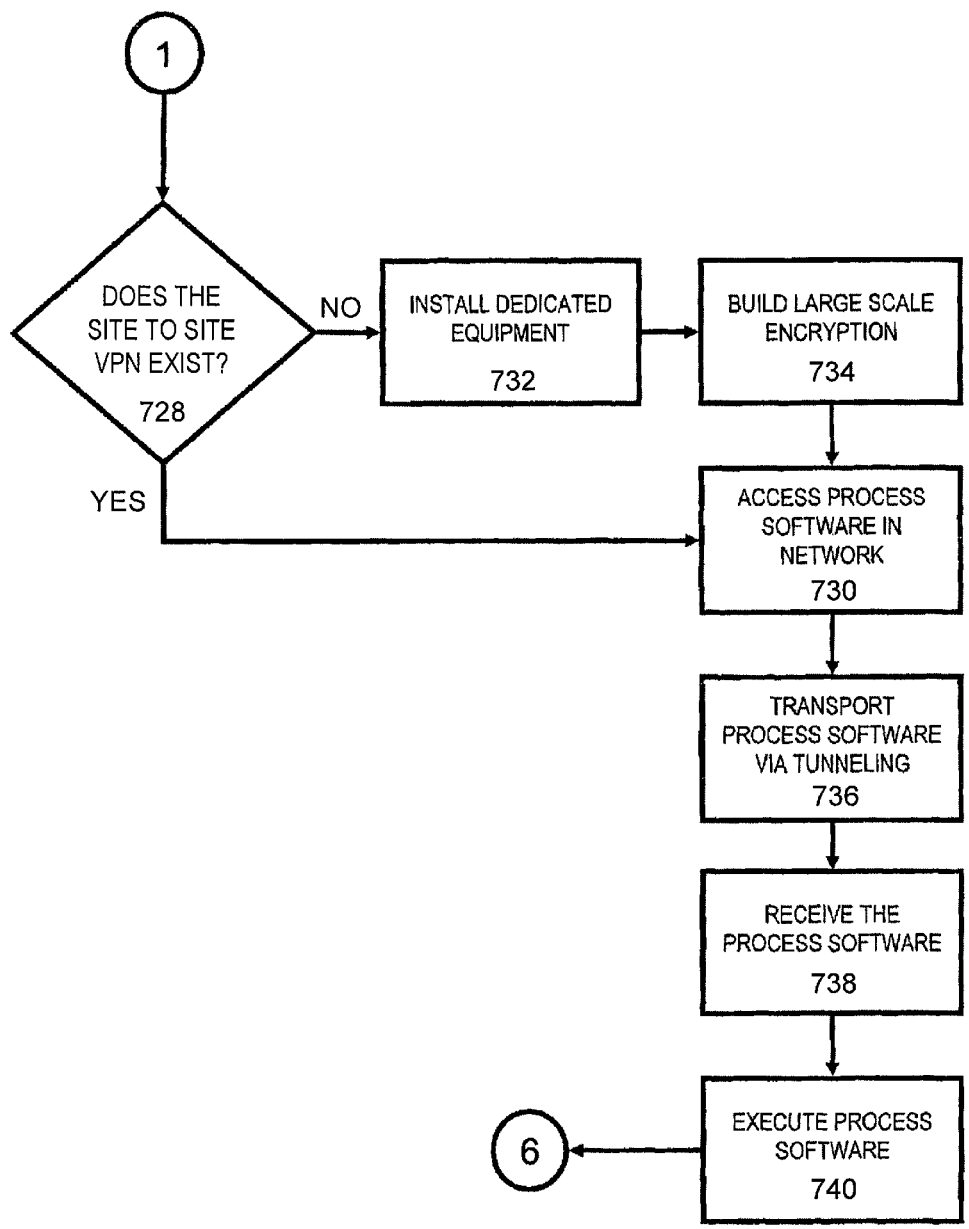
Figure 11C:
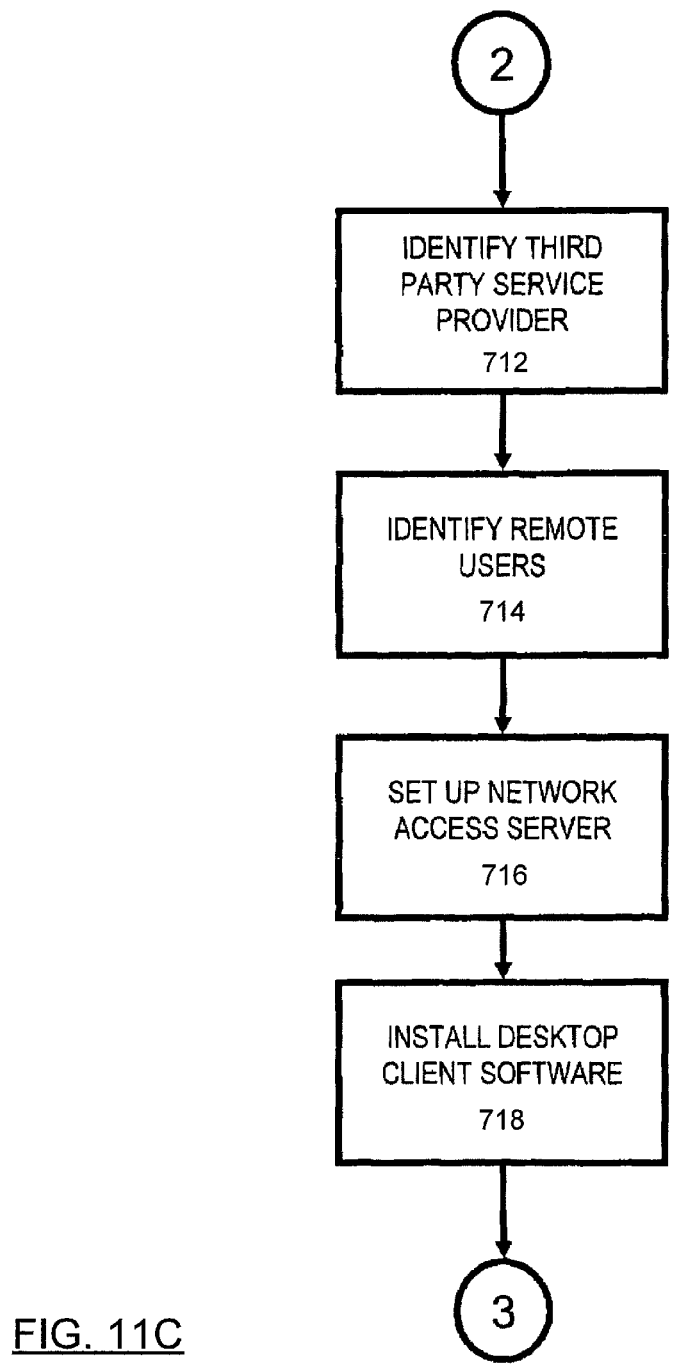

The process for such VPN deployment is described in FIG. 11. Block 702 begins the VPN process. A determination is made to see if a VPN for remote access is required (block 704). If it is required, then determine if the remote access VPN exists (block 708).

If a VPN does exist, then proceed to block 710. Otherwise identify the third party provider that will provide the secure, encrypted connections between the company's private network and the company's remote users (block 712). The company's remote users are identified (block 714). The third party provider then sets up an NAS (block 716) that allows the remote users to dial a toll free number or attach directly via a cable or DSL modem to access, download and install the desktop client software for the remote-access VPN (block 718).

After the remote access VPN has been built or if it been previously installed, the remote users can access the process software by dialing into the NAS or attaching directly via a cable or DSL modem into the NAS (block 710). This allows entry into the corporate network where the process software is accessed (block 720). The process software is transported to the remote user's desktop over the network via tunneling. That is, the process software is divided into packets and each packet including the data and protocol is placed within another packet (block 722). When the process software arrives at the remote user's desktop, it is removed from the packets, reconstituted and then is executed on the remote user's desktop (block 724).

A determination is made to see if a VPN for site to site access is required (block 706). If it is not required, then proceed to exit the process (block 726). Otherwise, determine if the site to site VPN exists (block 728). If it does exist, then proceed to block 730. Otherwise, install the dedicated equipment required to establish a site to site VPN (block 732). Then build the large scale encryption into the VPN (block 734).

After the site to site VPN has been built or if it had been previously established, the users access the process software via the VPN (block 730). The process software is transported to the site users over the network via tunneling (block 736). That is, the process software is divided into packets and each packet including the data and protocol is placed within another packet (block 738). When the process software arrives at the remote user's desktop, it is removed from the packets, reconstituted and is executed on the site user's desktop (block 740). The process then ends at block 726.

The process software may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 12A:
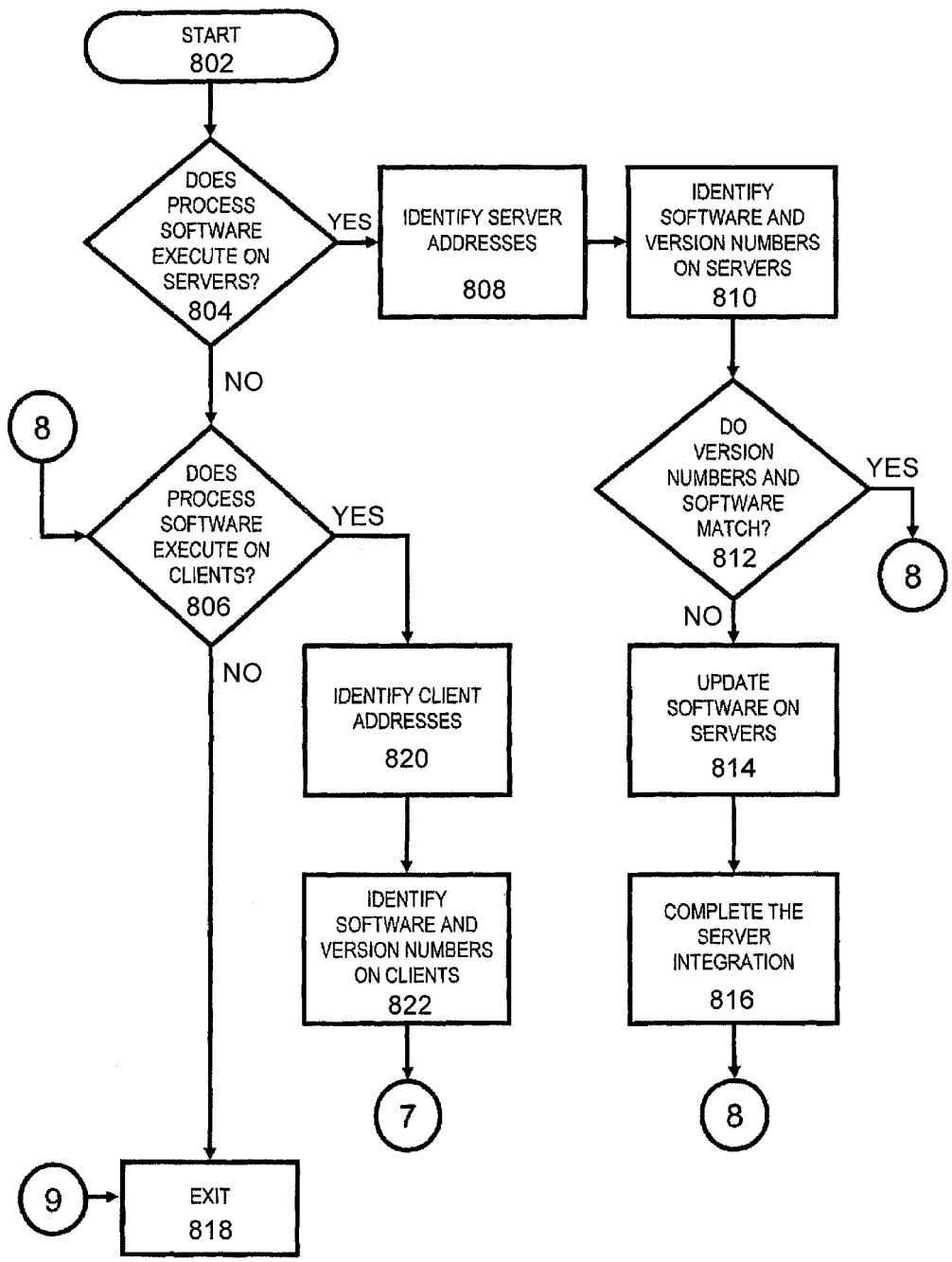
FIGS. 12a-b show a flowchart showing steps taken to integrate into a computer system process software according to an embodiment of the present invention.
Figure 12B:
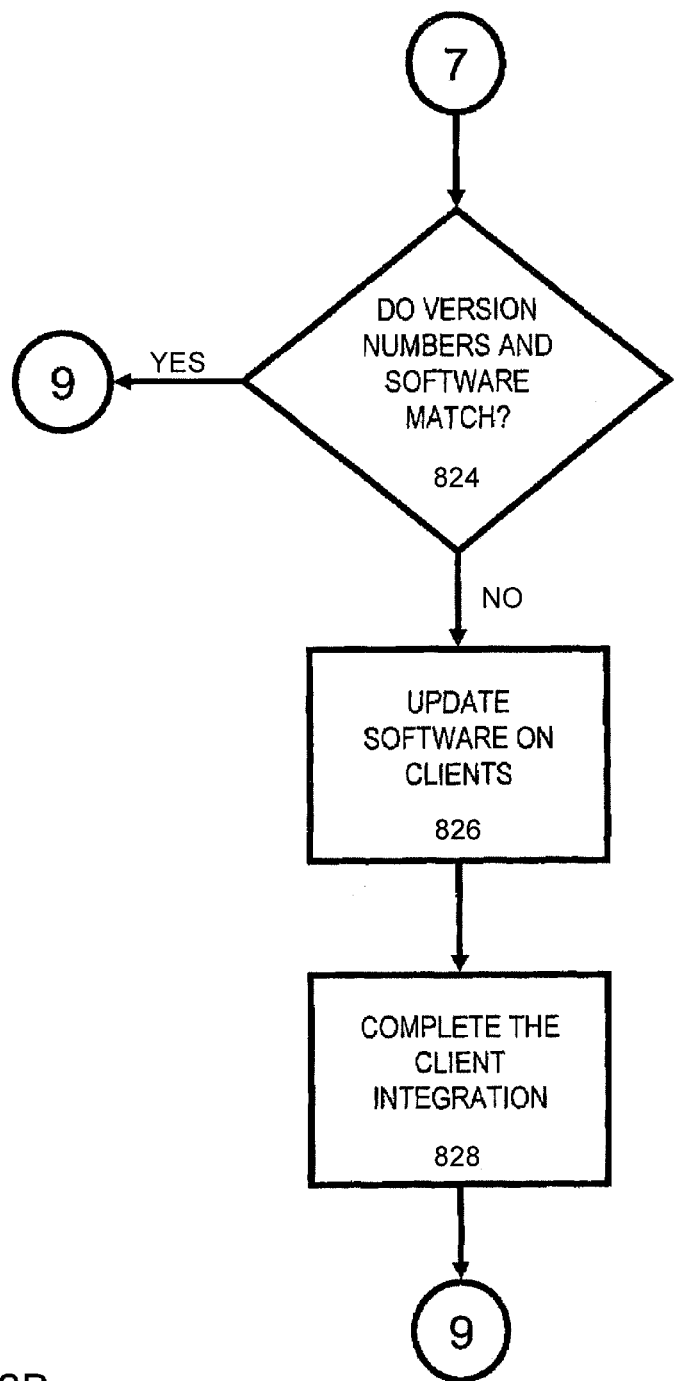

For a high-level description of this process, reference is now made to FIG. 12. Block 802 begins the integration of the process software. The first thing is to determine if there are any process software programs that will execute on a server or servers (block 804). If this is not the case, then integration proceeds to block 806. If this is the case, then the server addresses are identified (block 808). The servers are checked to see if they contain software that includes the operating system (OS), applications, and network operating systems (NOS), together with their version numbers that have been tested with the process software (block 810). The servers are also checked to determine if there is any missing software that is required by the process software (block 810).

A determination is made if the version numbers match the version numbers of OS, applications and NOS that have been tested with the process software (block 812). If all of the versions match and there is no missing required software the integration continues in block 806.

If one or more of the version numbers do not match, then the unmatched versions are updated on the server or servers with the correct versions (block 814). Additionally, if there is missing required software, then it is updated on the server or servers (block 814). The server integration is completed by installing the process software (block 816).

The step shown in block 806, which follows either the steps shown in block 804, 812 or 816, determines if there are any programs of the process software that will execute on the clients. If no process software programs execute on the clients the integration proceeds to block 818 and exits. If this not the case, then the client addresses are identified (block 820).

The clients are checked to see if they contain software that includes the operating system (OS), applications, and network operating systems (NOS), together with their version numbers, which have been tested with the process software (block 822). The clients are also checked to determine if there is any missing software that is required by the process software (block 822).

A determination is made if the version numbers match the version numbers of OS, applications and NOS that have been tested with the process software (block 824). If all of the versions match and there is no missing required software, then the integration proceeds to block 818 and exits.

If one or more of the version numbers do not match, then the unmatched versions are updated on the clients with the correct versions (block 826). In addition, if there is missing required software then it is updated on the clients (block 826).

The client integration is completed by installing the process software on the clients (block 828). The integration proceeds to block 818 and exits.

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 13A:
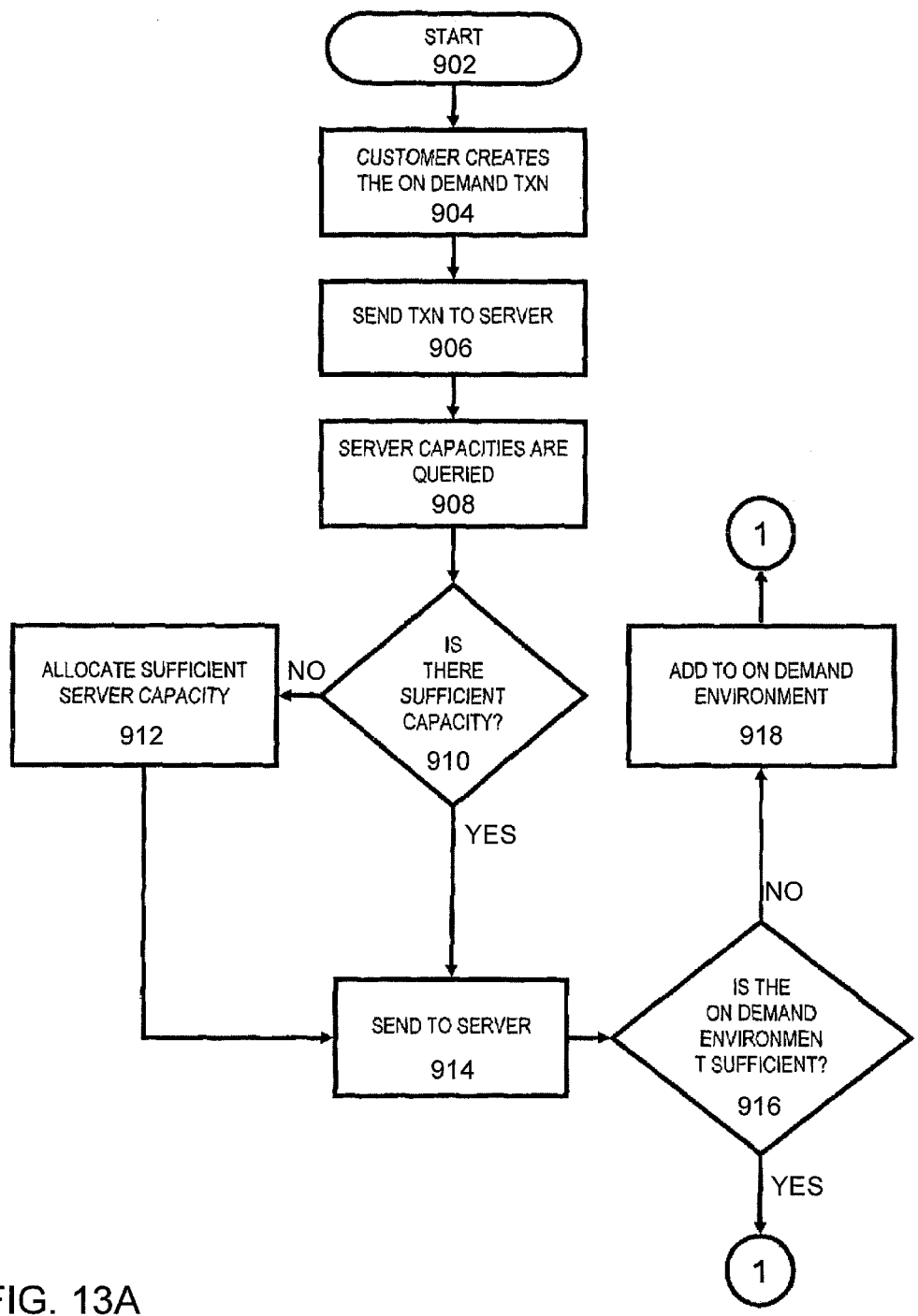
FIGS. 13a-b show a flowchart showing steps taken to execute the steps of process software using an on-demand service provider according to an embodiment of the present invention.
Figure 13B:
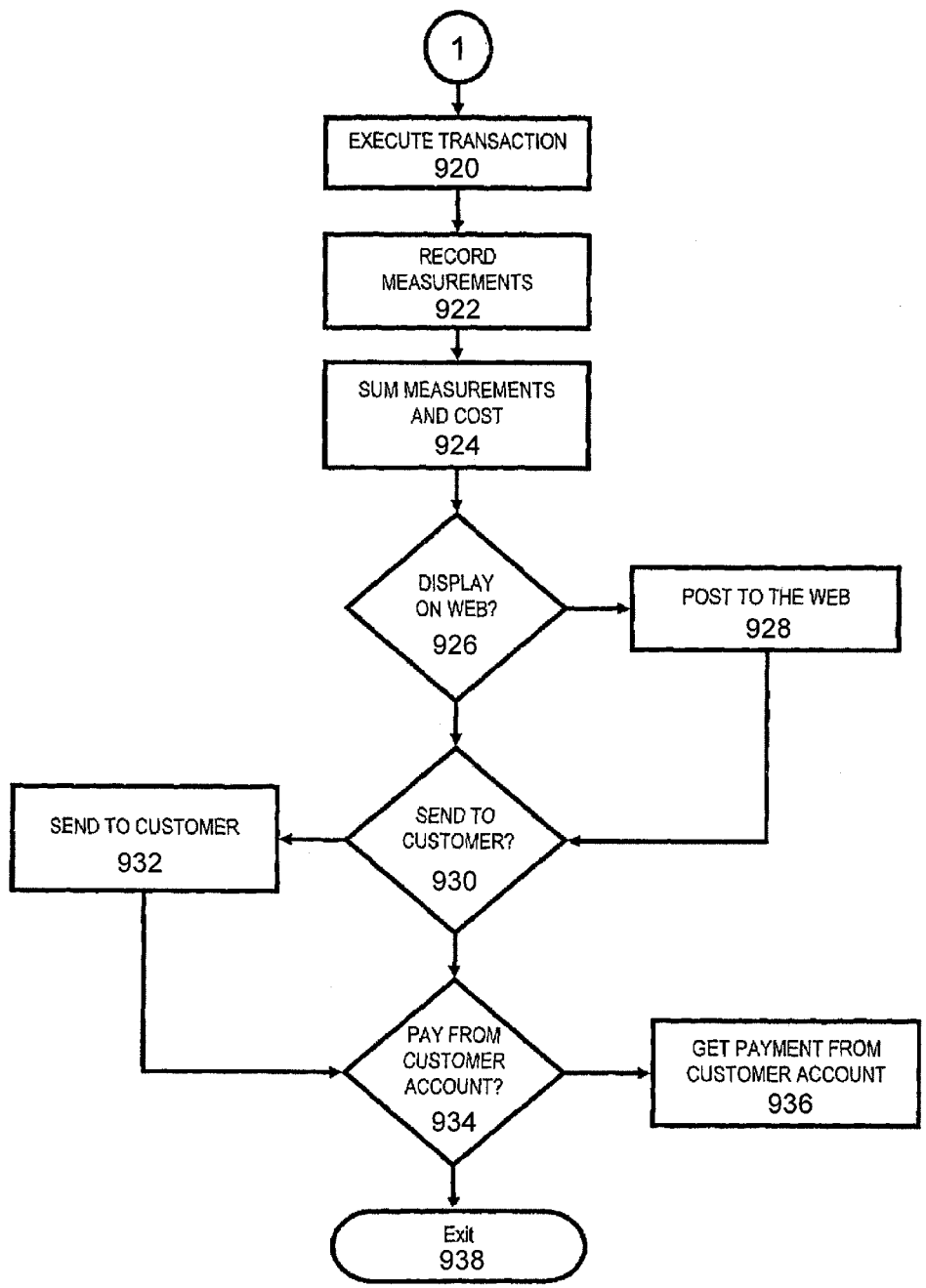

With reference now to FIG. 13, block 902 begins the On Demand process. A transaction is created than contains the unique customer identification, the requested service type and any service parameters that further, specify the type of service (block 904). The transaction is then sent to the main server (block 906). In an On Demand environment the main server can initially be the only server, and then as capacity is consumed other servers are added to the On Demand environment.

The server CPU capacities in the On Demand environment are queried (block 908). The CPU requirement of the transaction is estimated, then the server's available CPU capacity in the On Demand environment is compared to the transaction CPU requirement to see if there is sufficient CPU available capacity in any server to process the transaction (block 910). If there is not sufficient server CPU available capacity, then additional server CPU capacity is allocated to process the transaction (block 912). If there was already sufficient available CPU capacity then the transaction is sent to a selected server (block 914).

Before executing the transaction, a check is made of the remaining On Demand environment to determine if the environment has sufficient available capacity for processing the transaction. This environment capacity consists of such things as but not limited to network bandwidth, processor memory, storage etc. (block 916). If there is not sufficient available capacity, then capacity will be added to the On Demand environment (block 918). Next, the required software to process the transaction is accessed, loaded into memory, and then the transaction is executed (block 920).

The usage measurements are recorded (block 922). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 924).

If the customer has requested that the On Demand costs be posted to a web site (block 926), then they are posted (block 928). If the customer has requested that the On Demand costs be sent via e-mail to a customer address (block 930), then they are sent (block 932). If the customer has requested that the On Demand costs be paid directly from a customer account (block 934), then payment is received directly from the customer account (block 936). The On Demand process is then exited at block 938.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A non-transitory computer readable storage medium comprising a computer program for determining at least one attribute of a weather event comprising a plurality of elements, the computer program comprising:

first program instructions to receive an output generated by a pressure sensitive surface receiving pressure imparted by a raindrop falling on the pressure sensitive surface, the output indicating a location of applied pressure on the pressure sensitive surface, wherein the pressure sensitive surface is flat and declines toward an accumulator; and second program instructions to determine a first attribute of the at least one attribute at least in part from the output;

wherein the first attribute is an attribute selected from the group consisting of an average distance between falling raindrops impacting the pressure sensitive surface, and an average size of raindrops impacting the pressure sensitive surface;

wherein the first and second program instructions are stored on the non-transitory computer readable storage medium.

2. The non-transitory computer readable storage medium of claim 1, wherein the computer program is provided on a server of a service provider.

* * * * *